Patented Oct. 3, 1939

2,174,819

UNITED STATES PATENT OFFICE 2,174,819

OIL-SOLUBLE RESINOUS PRODUCTS

William H. Butler, Palisades Park, N. J., assignor to Bakelite Corporation, New York, N. Y., a corporation of Delaware No Drawing. Application December 12, 1936, Serial No. 115,630

8 Claims. (Cl. 260—51)

This invention relates to the production of fusible chemical condensation products of phenolic substances and aldehydes characterized by their high melting point and by a high degree of solubility in vegetable oils without requiring modification by rosin or other natural resins or natural resin acids. The solutions in drying or semi-drying oils, for example linseed oil and China-wood oil, are valuable as varnishes and as paint vehicles.

A principal object of the invention is the production of resinous condensation products which, when compounded with vegetable oils by the usual methods of varnish making, yield varnishes characterized by their brilliance and clarity and by the absence of sedimentation when diluted with the usual mineral thinners.

Another object of this invention is the production of resinous condensation products which, in addition to being soluble in vegetable oils, have a high melting point.

A further object of the invention is the production of resinous condensation products of improved color and light stability.

A still further object of the invention is the production of vegetable oil-resin compositions, characterized by brilliance and clarity which, when spread out in an extended film, will produce a rapid drying film of good durability against weathering and resistance to moisture, alkali, and other corrosive influences.

Broadly speaking, the method of improving the properties of the chemical condensation products of phenolic substances with aldehydic substances comprises heating the condensation products to relatively high temperatures, particularly of 175° C. and above, and preferably within the range 200—325° C., either in vacuum or presence of an inert gas or vapor.

One of the surprising effects of this method of treatment is the improvement effected in the oil solubility of the resinous condensation products so treated. Previously it has been thought that heating would advance or further polymerize such resinous condensation products and render them less fusible and less soluble. I have found, however, that this is the case only when the heat treatment is conducted at temperatures below 175° C. and, contrary to expectations, I have found that if these resinous condensation products are heated to temperatures of above 175° C., there are obtained resins which are less fusible, that is, the melting point of the resins is considerably increased, yet such resins are more soluble in vegetable oils than resins not so heat treated.

Such a result is entirely unexpected since ordinarily, resins, when heat treated to raise their melting point, become less and less soluble in vegetable oils. However, high melting resins are very desirable in varnish manufacture since, in general, the properties of durability, drying power and resistance of the varnish film to moisture and alkalies are associated with decreased fusibility or increased melting point of the resin. Consequently, the discovery that heat treating resins at temperature in excess of 175° C. not only increases their melting point but also increases their oil solubility is a highly important and novel contribution to the art.

It is also possible to raise the melting point of synthetic resins, especially phenol-formaldehyde resins, by prolonging the time during which resin condensation occurs. Such resins, particularly if the condensation time has been too prolonged, are normally insoluble in vegetable oils or at the best have only a fair oil solubility. I have found, however, that by heat treating such resins at temperatures above 175° C. they are rendered oil soluble or their oil solubility is greatly improved.

This increased oil solubility can be readily observed in oil varnishes containing these heat treated resins, such varnishes having a clarity and brilliance and absence of haze not possessed by varnishes of a comparable composition but containing similar resinous condensation products which have not been heat treated. Moreover, varnishes containing these heat treated resinous condensation products dry more rapidly, possess increased water and alkali resistance, are harder, more resistant to abrasion and are superior in color and light stability to varnishes prepared from resins not subjected to such heat treatment.

I have further found that a heat treatment above 200° C. of resins has a marked effect on the varnish polymerization time, i. e. the time required to completely gelatinize a dispersion of resin in China-wood oil. For example, phenol-formaldehyde resins, the melting point of which has been raised by prolonging the time during which resin condensation occurs and which normally have a short polymerization time, that is, hasten gelatinization, when heat treated above 175° C., undergo a change which apparently lengthens out the polymerization time so that these resins are not only rendered more oil soluble but are also easier to manipulate in the cooking of the varnish, since a retardation of the polymerization time means less tendency for the varnish to gel and thus provides the operator with a broader time and temperature range for the cooking of the varnish. On the other hand, I have found that with phenol-formaldehyde resins, the resin condensation time of which has been shortened so that only limited condensation has been affected, heat treatment above 175° C. will substantially improve the varnish polymerization time, since such resins when not heat treated above 175° C. usually possess a long polymerization time, whereas if heat treated as described, the polymerization time can be shortened to where it is still practical for the normal varnish cooking procedure and yet short enough to materially accelerate the drying and baking time of varnishes made with these heat treated resins. Acceleration of the varnish polymerization time is of great importance, especially when using such slow drying oils as linseed and perilla oils.

I have also found that heat treatment above 175° C. of resins greatly reduces the weight losses which are usually observed during the cooking of resins in oil. Thus, a phenol-formaldehyde resin not heat treated above 175° C. exhibited a loss of 20% when cooked in oil at 450° F., whereas a similar resin heat treated for 2 hours in steam at 200° C. showed a loss of 15.9% during the heat treatment but only a further loss of 3.5% when cooked in oil at 450° F. The hardness, drying time and alkali resistance of the varnish film prepared from the varnish containing the heat treated resin were far superior to a similar varnish film prepared from the varnish containing the non-heat treated resin. Since both the heat treated and the non-heat treated resins suffered a total volatile loss of practically the same amount it is evident that the superiority of the varnish film made from the heat treated resins must be due to some additional change or alteration in the resin structure which such heat treated resins undergo other than that resulting from a mere loss of volatiles.

I have found that practically all types of phenolic resins are improved by heat processing at high temperatures, but the most marked improvement is accomplished when heat processing is applied to those phenolic resins which do not require modification with rosin or other natural resins or resin acids to render them oil soluble. In particular, I prefer to use resinous condensation products prepared by reacting a phenol, which possesses an alkyl or aryl substituent in the ortho-and/or para-positions as, for example, ortho- or para-phenyl, amyl, or butyl phenol, para-benzyl phenol, high boiling tar acids containing as the major constituent trimethyl phenols, and the like, with an aldehyde such as formaldehyde or its polymers, such as paraformaldehyde. Other aldehydic bodies, such as acetaldehyde, furfural, and the like, may be used but have proven less desirable either because of the color, low melting point or lack of water and alkali resistance of the resulting resinous condensation products. While the condensation reaction between the phenolic and aldehydic body may be catalyzed by either alkalies or acids, or it may be carried out in the absence of catalyst by conducting the reaction under pressures greater than atmospheric, I prefer for the purposes of this invention to use either those resins which have been prepared in the presence of an acid catalyst or those prepared in the absence of a catalyst, which resins are permanently fusible, that is, they remain fusible even when treated at temperatures above 175° C.

The resin reaction is carried out in the usual manner, the phenol and formaldehyde being mixed in approximately equi-molecular proportions and then heated, generally at atmospheric pressure under a reflux and in the presence of one to two per cent of an acid catalyst until a resinous layer is formed. The acid catalyst is preferably an organic acid such as oxalic, citric, succinic, formic or the like, but a dilute solution of a strong inorganic acid, such as hydrochloric acid or a weak acid, such as boric acid, may be used. The aqueous layer is removed either by decantation or by distillation under atmospheric or diminished pressure, or the major portion of the water may be removed by decantation and the resin then further dehydrated by heating at atmospheric or reduced pressure until a hard, brittle, clear resinous material is obtained. The melting point of these resins will vary with the nature of raw materials, with the time and temperature of the reaction, with the extent of the dehydration and other factors. Generally speaking, however, phenolic resins, prepared as above described and suitable for use in oil varnishes, will have melting points ranging from about 60° C. to about 150° C. Other considerations being equal, the higher melting resins are most desired by the varnish maker, since oil varnishes made therefrom are more rapid drying and deposit a more durable and resistant film of higher integrity than varnishes containing resins softening at the lower temperature range. Prior to the present invention, however, the higher melting resinous condensation products have been deficient in oil solubility. While frequently described as being readily soluble in fatty oils, varnishes made from these resins have shown a characteristic lack of brilliance and are cloudy, hazy and will tolerate only a limited proportion of mineral thinners.

The following examples are illustrative of the principles of the invention:

Example 1

A resinous condensation product was prepared by refluxing for 1½ hours 10 kilograms of xylenol with 5.4 kilograms of a 37½% solution of formaldehyde in the presence of 0.1 kilogram of oxalic acid. The reaction mix was cooled, the aqueous layer decanted and the resin layer dehydrated by heating to 114° C. in a vacuum of 20—21 inches of mercury.

A portion of the resin was heated in steam at 260° C. for one-half hour. By this treatment the melting point of the resin was increased from 113° C. to about 150° C. Samples of the original and of the heat treated resin were heated to 200° C. with China-wood oil in the proportion of two parts of oil to one part of the resin and the thinner tolerance of the oil-resin dispersion was determined by adding measured quantities of thinner to 100 parts dispersion until turbidity was caused. The original resin would not dissolve in the oil without turbidity while the dispersion of the heat treated resin could be diluted with 84 parts of thinner before turbidity appeared. When the oil-resin dispersion was formed at 232° C., the dispersion of the original resin withstood 50 parts of thinner, while the dispersion of the heat treated resin withstood 90 parts of thinner before becoming turbid.

A varnish was prepared from both the original and the heat processed resin by heating one part of the resin with two parts of China-wood oil to 232° C., adding a drier containing the equivalent of 2 grams of cobalt as metal per gallon of varnish, and thinning to brushing viscosity by the addition of thinner.

The varnish from the untreated resin dried to a non-tacky condition in 4.5 hours and print free in 5.5 hours, while the varnish from the heat processed resin dried non-tacky in 2.75 hours and print free in 3.5 hours. The hardness of the film from the untreated resin, as determined by the Gardner-Holdt swinging beam method, after 8 hours was 13 and after 96 hours was 100, while the hardness of the film from the heat processed resin was 30 after 8 hours and 137 after 96 hours. When the films were tested for resistance to 5% caustic soda solution, the fi'm from the untreated resin showed white in 15 hours while the film from the heat processed resin did not show white for 336 hours.

Example 2

A resinous product was made as described in Example 1, except that the time of refluxing the xylenol and formaldehyde solution was increased to 1¾ hours. The resin was dehydrated by heating it to 120° C. at atmospheric pressure, and a portion of the resin was heated in steam for ½ hour at 260° C. The melting point of the resin was increased from 119° C. to 166° C. The dilution factor of the China-wood oil varnish made at 200° C. was increased from nil to 70, and the drying time, hardness and resistance to alkali of the varnish were improved similarly to the improvements described in Example 1.

Example 3

A resin was made as described in Examp'e 2 except that the xylenol and formaldehyde solution were refluxed for on'y ¾ hour. A portion of the resin was heat treated as in Example 2.

The melting point was increased from 100° C. to 150° C. and the dilution factor, drying time, hardness and alkali resistance of the resin were all improved to a similar extent to that described in Example 1. The varnish polymerization time of the heat treated resin was shortened as compared with the original resin, as is usually the case with resins which have been condensed for smaller periods of time, that is, lower melting resins.

Example 4

A resinous condensation product was prepared from a mixture of high boiling tar acids, boiling between 225°—250° C., by refluxing 100 parts of tar acids with 45 parts of formalin for a period of two hours in the presence of 1% of a 10% solution of hydrochloric acid. The aqueous layer was decanted away frm the resin layer which was then dehydrated by heating to 140° C. The resin was then heat processed by heating it and passing a current of steam at 190—330° C. through it for 1¼ hours. The melting point of the resin was increased from 103° C. to 143° C.

Example 5

A condensation was carried out as described in Example 4 but the reaction time was increased to 2½ hours. The resin after being dehydrated by heating to 146° C. was heat processed by heating it in a current of steam at 210—260° C. for 2 hours and 40 minutes. The melting point of the resin was increased to 143° C.

Example 6

A condensation was carried out as described in Example 5 but the resin was heat processed by heating it in a current of steam at 175—226° C. for 3 hours. The melting point of the resin was increased to 138° C.

In each case the melting point of the resin was raised, the hardness of the varnish film was increased, the varnish polymerization time was much shortened, which, in effect, means a quicker drying varnish, and the alkali resistance was notably improved.

Example 7

A resinous condensation product was prepared by reacting tertiary butyl phenol with formaldehyde in a manner similar to that described above; namely, 100 parts of tertiary butyl phenol, 100 parts of formaldehyde, and 2 parts of oxalic acid, were refluxed for a period of 5½ hours or until a resin separation occurred. The aqueous layer was decanted and the resin dehydrated at atmospheric pressure to a temperature of 120° C. The product was a hard light-colored resin soluble in fatty oils, and a varnish was prepared using 50 parts of the above resinous condensation product and 117 parts of China-wood oil. Resin and oil were heated together to a temperature of 260° C. The time required to reach this temperature was about 25—30 minutes; then the varnish was cooled to 230° C. in from 3—5 minutes, and this temperature was maintained for 15 minutes. The varnish was then thinned with 167 parts petroleum thinner, and the result was a hazy, murky appearing varnish. On standing at room temperature for 24 hours, a finely divided precipitate had settled on the bottom of the varnish container. The varnish still possessed a certain amount of haze which could not be removed by the usual methods of clarification.

Other portions of the dehydrated resinous condensation prepared from butyl phenol and formaldehyde, were heat processed by heating with steam for about 25 minutes at 200°—250° C., 250°—275° C., 275°—300° C. and 300°—325° C.

The melting points of the heat processed resins were 122° C., 138° C., 142° C. and 147° C. The clearness of the resulting varnishes was progressively improved, the varnishes from the resins heat at the higher temperature being very clear and bright. The drying times were progressively decreased from 5 hours non-tacky to from 3½ to 1¾ hours and from 7 hours print free to from 5 to 2¼ hours. The hardness of the varnish film and its resistance to alkali were very substantially increased.

Example 8

A resinous condensation product was prepared from a mixture of high boiling tar acids, boiling between 225—250° C. by refluxing 2000 parts of tar acids with 1500 parts of formaldehyde solution (37%) and 20 parts of oxalic acid for 7 hours. The aqueous layer was decanted away from the resin layer which was then dehydrated by heating to 140° C. The melting point of this resin was 107° C. Different portions of this resin were heat treated as shown in the following table which also indicates effect of such heat treatment on the melting point and polymerization time.

| | | M. P. | Polymerization time | |
|---|---|---|---|---|
| | | °C. | Minutes | Seconds |
| 1 | Resin untreated | 107 | 22 | 50 |
| 2 | Resin heated 2 hours in steam 200° C. | 141 | 23 | 35 |
| 3 | Resin heated 1 hour in steam 260-270° C. | 135 | 25 | 25 |
| 4 | Resin heated 2 hours in vacuo 200° C. | 118 | 25 | 0 |
| 5 | Resin heated 2 hours in air at 200° C. | 120 | 24 | 55 |

The table shows the manner in which the polymerization time of a resin whose resin condensation time has been prolonged is increased by heat treatment particularly when heated in steam at 260°—270° C. All the heat treated resins were more readily oil soluble than the non-heat treated resin, this being particularly true of the resin heated 1 hour in steam at 260—270° C.

Example 9

75 parts of a resin prepared from tertiary butyl phenol and formaldehyde using an acid catalyst as described in Example 7 were mixed with 25 parts of a resin prepared by reacting 100 parts paraphenyl phenol, 100 parts formaldehyde and 1 part oxalic acid. Each resin was first dehydrated by heating to 150° C. The mixture of the two resins was then heat treated for ½ hour in steam at 310° C. The resulting product was clear and light colored, melting at 150—160° C. The resinous mixture before heat treatment had a melting point of about 100° C. A varnish prepared by heating 100 parts of the heat treated resinous mixture with 150 parts China-wood oil at 280° C. and then thinning with mineral spirits was bright, clear and remained stable on aging, whereas a similar varnish, prepared from the same mixture of resins not heat treated, was cloudy and on aging deposited a heavy precipitate.

This application is a continuation-in-part of my application, Serial No. 757,068 filed December 11, 1934.

I claim:

1. A method of improving the properties of resinous condensation products of phenols and formaldehyde for the production of oil resin coating compositions which comprises heating the condensation product in the absence of added substances other than inert gaseous substances at a temperature of above 175° C. whereby the solubility of the condensation production in vegetable oils is substantially improved.

2. A method of improving the properties of resinous condensation products of phenols and formaldehyde for the production of oil-resin coating compositions which comprises heating the condensation product in the absence of added substances other than inert gaseous substances at a temperature of above 175° C. until the melting point of the condensation product is substantially increased whereby the solubility of the condensation product in vegetable oils is substantially improved.

3. A method of improving the properties of resinous condensation products of phenols and aldehydes for the production of oil-resin coating compositions which comprises heating the condensation product in the absence of added substances other than inert gaseous substances at a temperature of from 200° to 235° C. whereby the solubility of the condensation product in vegetable oils is substantially improved.

4. A method of improving the properties of resinous condensation products of phenols and aldehydes for the production of oil-resin coating compositions which comprises heating the condensation product in the absence of added substances other than inert gaseous substances at a temperature of from 200° to 235° C. for at least fifteen minutes whereby the solubility of the condensation product in vegetable oils is substantially improved.

5. A method of improving the properties of resinous condensation products of phenols and formaldehyde for the production of oil-resin coating compositions which comprises heating the condensation product in the absence of added substances other than steam at a temperature of above 175° C. whereby the solubility of the condensation product in vegetable oils is substantially improved.

6. A method of improving the properties of resinous condensation products of phenols and aldehydes for the production of oil-resin coating compositions which comprises heating the condensation product in the absence of added substances other than steam at a temperature of from 200° to 235° C. whereby the solubility of the condensation product in vegetable oils is substantially improved.

7. A method of improving the properties of resinous condensation products of phenols and formaldehyde for the production of oil-resin coating compositions which comprises heating the condensation product of formaldehyde and a phenol substituted in at least the ortho- or para-position by an alkyl or aryl group in the absence of added substances other than inert gaseous substances at a temperature of above 175° C. whereby the solubility of the condensation product in vegetable oils is substantially improved.

8. A method of improving the properties of resinous condensation products of phenols and aldehydes for the production of oil-resin coating compositions which comprises heating the condensation product of formaldehyde and a phenol substituted in at least the ortho- or para-position by an alkyl or aryl group in the absence of added substances other than inert gaseous substances at a temperature of from 200° to 235° C. whereby the solubility of the condensation product in vegetable oils is substantially improved.

WILLIAM H. BUTLER.

CERTIFICATE OF CORRECTION.

Patent No. 2,174,819. October 3, 1939.

WILLIAM H. BUTLER.

It is hereby certified that error appears in the printed specification of the above numbered patent requiring correction as follows: Page 4, first column, line 36, claim 1, for the word "production" read product; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.